US009055220B1

(12) United States Patent
Kozko

(10) Patent No.: US 9,055,220 B1
(45) Date of Patent: *Jun. 9, 2015

(54) ENABLING THE INTEGRATION OF A THREE HUNDRED AND SIXTY DEGREE PANORAMIC CAMERA WITHIN A MOBILE DEVICE CASE

(71) Applicant: Dmitry Kozko, Aventura, FL (US)

(72) Inventor: Dmitry Kozko, Aventura, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/280,071

(22) Filed: May 16, 2014

Related U.S. Application Data

(63) Continuation of application No. 14/092,393, filed on Nov. 27, 2013, now Pat. No. 8,730,299.

(51) Int. Cl.
*H04N 5/225* (2006.01)
*H04N 5/232* (2006.01)

(52) U.S. Cl.
CPC ................. *H04N 5/23238* (2013.01)

(58) Field of Classification Search
None
See application file for complete search history.

(56) References Cited

U.S. PATENT DOCUMENTS

| 8,730,299 B1 * | 5/2014 | Kozko | 348/38 |
| 2012/0206565 A1 * | 8/2012 | Villmer | 348/36 |

* cited by examiner

*Primary Examiner* — Andy Rao
*Assistant Examiner* — Tyler Edwards
(74) *Attorney, Agent, or Firm* — Patents on Demand P.A.; Brian K. Buchheit; Scott M. Garrett

(57) ABSTRACT

A user activation of an image capture function of a mobile device is received. The image capture function is for a surround image mode. Two or more camera lenses of a mobile device case are approximately concurrently activated. Responsive to activating the lenses, a front-side image from a first camera lens and a rear-side image from a second camera lens are optically captured. Content from the front-side image and content from the rear-side are recorded in a non-transitory storage medium of the mobile device within a single file for a surround mode image.

20 Claims, 8 Drawing Sheets

100A

Embodiment 110

Case 112
- Decoration 101 (e.g., Logos, Designs)
- Protective Layers 102
- Input/Output Accommodations 103 (e.g., Power connector cut out)
- 360° Panoramic Camera 104
  - Lenses 105 (e.g., Rear, Front)
  - Image Sensor 106
- Power Source 107
- Transceiver 108
- Cavity 109

Mobile Phone 114
- Input/Output Elements 111 (e.g., Input Buttons)
- Internal Cameras 113
  - Rear Facing Lense 120
  - Front Facing Lense 121
- Display 115 (e.g., Touch Screen)
- Power Source 116
- Transceiver 117
- Housing 118

Embodiment 140

Lense 105

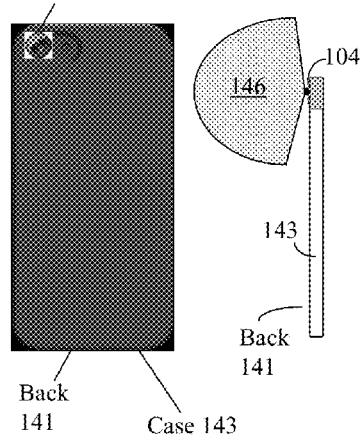

Back 141    Case 143    Back 141

Embodiment 150

Lense 105

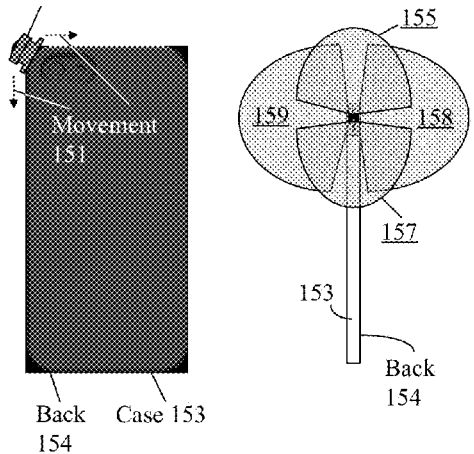

Back 154    Case 153    Back 154

FIG. 1A

Embodiment 160
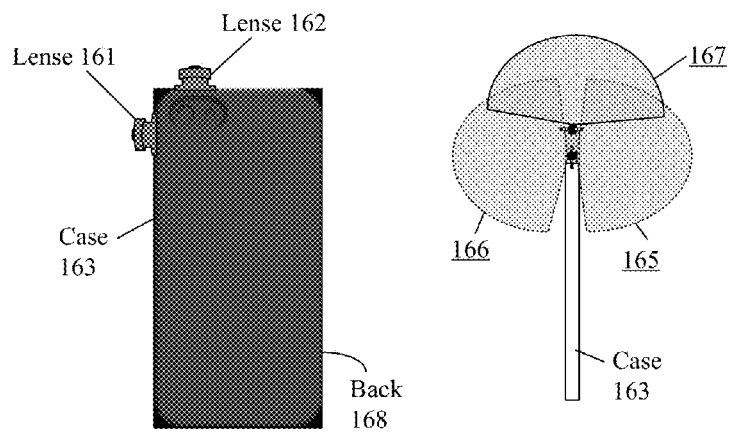
Embodiment 170
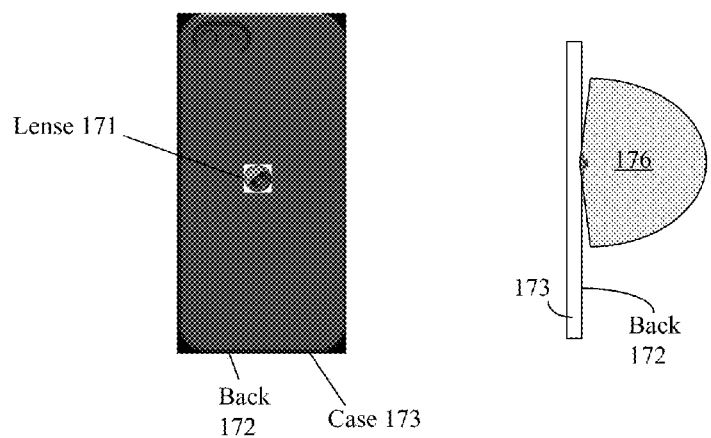
FIG. 1B

Embodiment 180
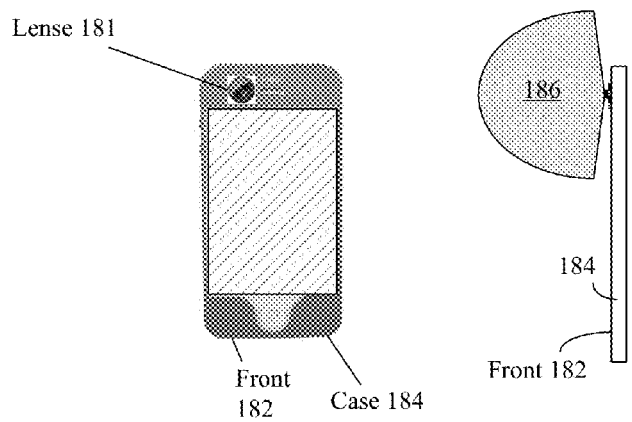
Embodiment 190
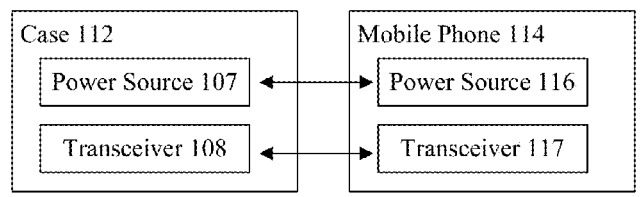
Embodiment 192
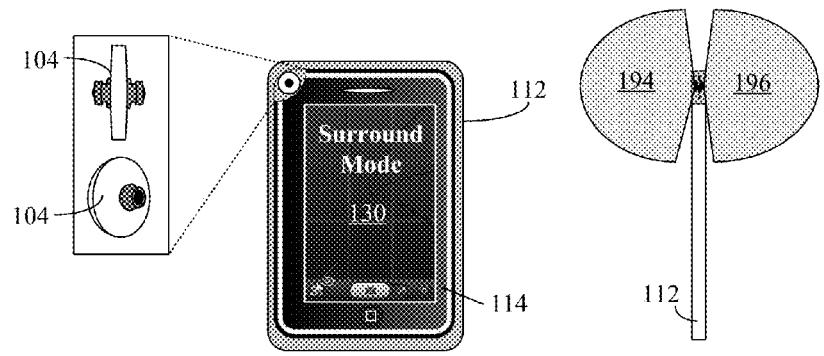
FIG. 1C

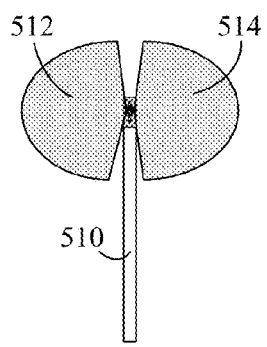
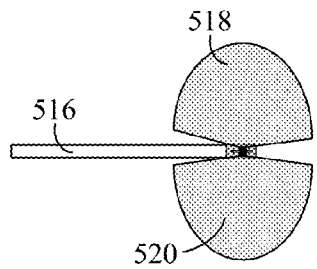
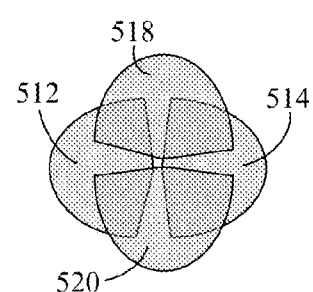
FIG. 5A  FIG. 5B  FIG. 5C
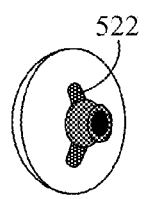
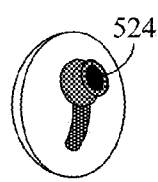
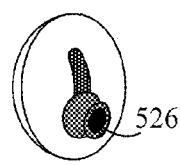
FIG. 5D  FIG. 5E  FIG. 5F
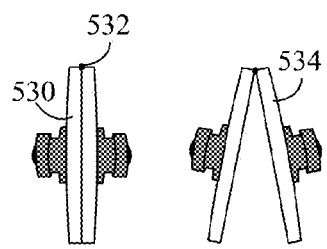
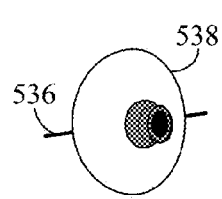
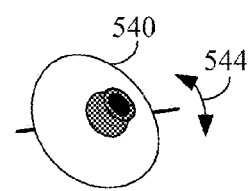
FIG. 5G  FIG. 5H  FIG. 5I  FIG. 5J

ENABLING THE INTEGRATION OF A THREE HUNDRED AND SIXTY DEGREE PANORAMIC CAMERA WITHIN A MOBILE DEVICE CASE

CROSS-REFERENCE TO RELATED APPLICATION

This application is a continuation of U.S. patent application Ser. No. 14/092,393, filed on Nov. 27, 2013 of which is incorporated herein in it's entirety.

BACKGROUND

The present invention relates to the field of imaging and, more particularly, to a enabling the integration of a three hundred and sixty degree panoramic camera within a mobile device case.

Increasingly, camera equipped mobile devices like mobile phones, tablets, smart glasses, and wearables are replacing formerly discrete devices, such as still and video cameras. Consumers have begun to demand additional functionality from these devices (or from digital cameras). For example, cameras able to record depth for 3D and 4D imagining have begun to emerge. Similarly, panoramic modes for image capture are becoming an increasingly popular feature of many modern mobile device operating systems.

Conventional panoramic capture modes require successive movements of a device with a single activated lens. The movement permits different fields of view to be captured at different points in time, which can be stitched together into a panoramic view. Using conventional techniques, capturing scenes in this manner can be time consuming, and dynamic movement within the scenes (causing discrepancies in the time spaced images) can be problematic.

Another conventional panoramic technique is to utilize a single ultra-wide angle lens to capture a panoramic scene. This ultra-wide angle lenses may result in significant distortion, but the convenience of capturing a scene without time spacing images, outweighs these negatives to many users and manufactures. Some panoramic lenses are optical peripherals attachable to a mobile phone, such as a phone) to bend incoming light (using a fish-eye lens for example) before it enters the camera's internal optical components.

One solution such as clip on adapters which permit panoramic capabilities can cause the mobile device to be cumbersome and weighty. Further, the solutions often only provide limited field of view which can result in the omission of critical imagery. Additionally, many adapters force users to orient mobile phones in non-standard orientations (e.g., flat) which can block users from seeing a live preview of a panoramic camera.

BRIEF DESCRIPTION OF THE SEVERAL VIEWS OF THE DRAWINGS

FIG. 1A is a schematic diagram illustrating a set of embodiments for enabling the integration of a three hundred and sixty degree panoramic camera within a mobile device case in accordance with an embodiment of the inventive arrangements disclosed herein.

FIG. 1B is a schematic diagram illustrating a set of embodiments for enabling the integration of a three hundred and sixty degree panoramic camera within a mobile device case in accordance with an embodiment of the inventive arrangements disclosed herein.

FIG. 1C is a schematic diagram illustrating a set of embodiments for enabling the integration of a three hundred and sixty degree panoramic camera within a mobile device case in accordance with an embodiment of the inventive arrangements disclosed herein.

FIG. 5A-J is a schematic diagram illustrating a set of embodiments for enabling the integration of a three hundred and sixty degree panoramic camera within a mobile device case in accordance with an embodiment of the inventive arrangements disclosed herein.

DETAILED DESCRIPTION

Figure 2:
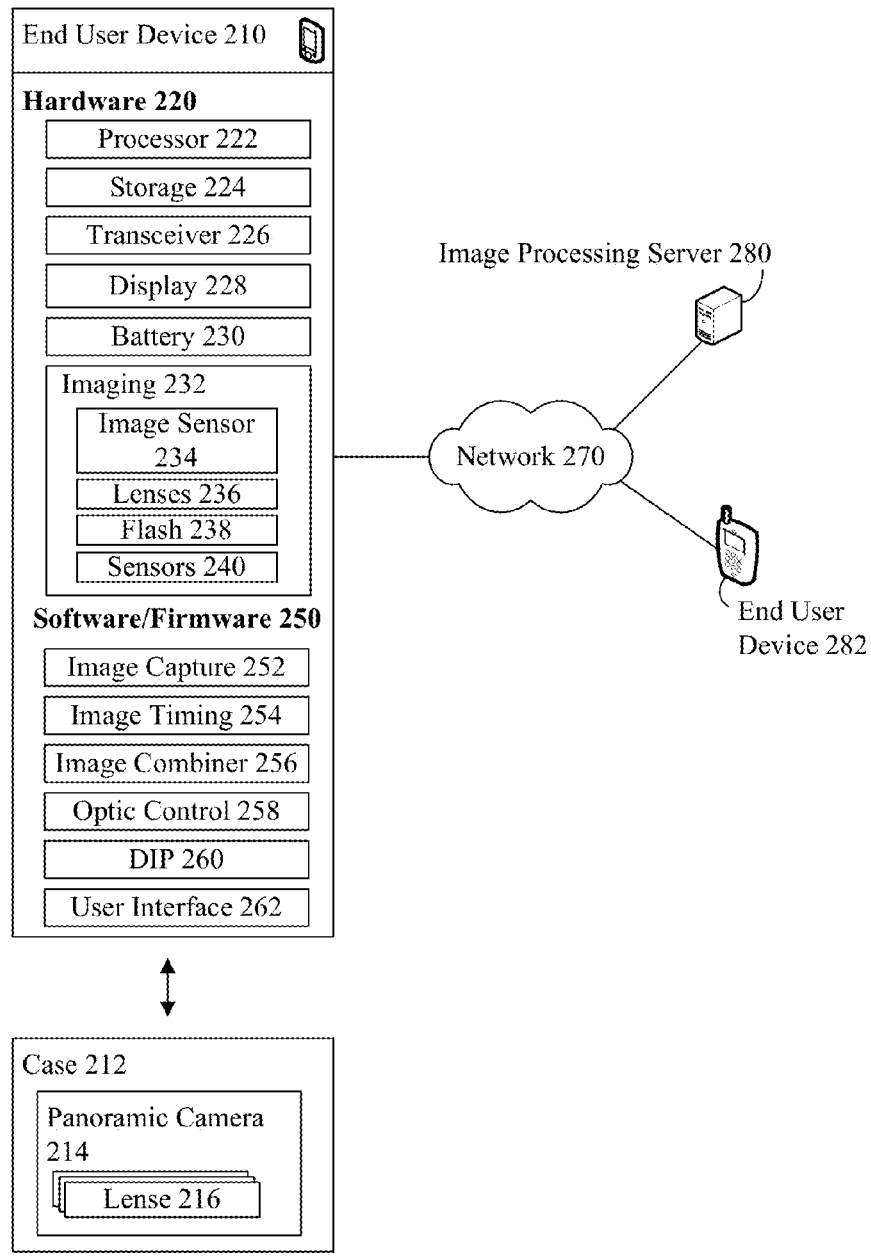
FIG. 2 is a schematic diagram illustrating a system for enabling the integration of a three hundred and sixty degree panoramic camera within a mobile device case in accordance with an embodiment of the inventive arrangements disclosed herein.

The present disclosure is a solution for enabling the integration of a three hundred and sixty degree panoramic camera within a mobile device case. In the solution, a panoramic camera can be embedded within a mobile device case. The camera can include one or more wide angle lense, ultra wide angle lense, and the like. In one embodiment, the panoramic camera can include a front and rear facing lense which can capture an aggregate field of view of 180 degrees or greater. In one instance, the panoramic camera of the case can be triggered in response to a surround mode of a mobile device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a set of embodiments 110, 140, 150 for enabling the integration of a three hundred and sixty degree panoramic camera within a mobile device case in accordance with an embodiment of the inventive arrangements disclosed herein.

As used herein, case 112 can be a mobile device accessory able to substantially protect and/or enhance the operation, usability, and/or appearance of the phone. Case 112 can include, but is not limited to, a decoration 101, protective layers 102, input/output accommodations 103, 360° panoramic camera 104, power source 107, transceiver 108, cavity 109, and the like. Panoramic camera 104 can include, but is not limited to, lenses 105, image sensor 106, and the like. It should be appreciated that case 112 can lack one or more elements 101-109 permitting the functionality of the case described herein is retained.

It should be appreciated that case 112 can include, but is not limited to, socks, gloves, sleeves, pouches, skins, wallets, face plates, and the like. It should be understood that case 112 can include any traditional and/or proprietary material including, but not limited to, silicone, soft rubber, high impact materials, and the like. In one instance, sensitive components (e.g., camera 104, power source 107) can be embedded within impact resistant layers to permit the components to be protected from light (e.g., bumps) to harsh use (e.g., drops).

Mobile phone 114 can be a telecommunications device able to transmit/receive voice calls and/or data communication. In another embodiment, phone 114 may be substituted with any of a variety of mobile devices, such as a tablet, a handheld entertainment system, a wearable computing device, and the like. The case 112 can be designed for the dimensions and specifics of the mobile device. The example of a mobile phone 114 is used throughout this disclosure for simplicity of expression and clarity of description, but is not intended to limit the scope of the disclosure, which includes any of a variety of mobile devices, as is evident to one of ordinary skill That is, references to a phone and/or a phone case are intended to be substitutable with tablet/tablet case, handheld gaming device/case, media player/case, and the like.

Phone 114 (or other mobile electronic device) can include, but is not limited to, input/output elements 11, internal cameras 113, display 115, power source 116, transceiver 117, housing 118, and the like. Phone 114 can include additional components or can lack components 111-118 providing the functionality of the mobile phone described herein is retained.

It should be appreciated that camera 104 of case 112 can be communicatively linked to phone 114. In one embodiment, a real-time view from camera 104 can be presented within display 115 of phone 114. In the embodiment, phone 114 can be utilized to capture panoramic media from camera 104 during a surround mode 130 (e.g., embodiment 192). For example, a camera application executing on mobile phone 114 can leverage camera 104 to capture a 360 degree view of a real world environment such as a conference room of a building.

In embodiment 110, 140, 150, 160, 170, 180, lenses can be an internal and/or external component of the mobile phone case. For example, the case can include one or more panoramic lenses which can enhance the photographic capabilities of internal cameras 113 or can replace the capabilities of internal cameras 113.

In embodiment 110, a mobile phone 114 can be physically coupled to a case 112. For example, housing of phone 114 can be fitted into cavity of case 112. In one embodiment, case 112 can include a panoramic camera which can include one or more lenses (e.g., lense 142, 152). In the embodiment, phone 114 can be communicatively linked to enable phone 114 to utilize the panoramic camera of case 114 to capture panoramic media (e.g., images, video).

In embodiment 140, lense 105 of a case 143 can be positioned over an internal camera (e.g., 113 of mobile phone 114) which can be utilized to replace and/or enhance camera 113 capability. In the embodiment, the rear facing lense 105 can capture a panoramic (e.g., ultra wide angle) field of view 146 which can be communicated to phone 114. For example, the lense 105 can be a rear facing 360° camera fitted to the back 141 of the case 143 permitting case 143 to operate in a familiar fashion (e.g., pointing the rear facing camera at a subject).

In embodiment 150, lense 105 can be positioned on edge of case 153 (e.g., side face). In one instance, lense 105 can be manually and/or manually actuated permitting lense 105 to be positioned at the top edge, corner, side edge, and the like of the case 153 via movement 151. For example, lense 105 can be manually slide an inch in either direction (e.g., up to top of case, down to side of case) to enable customizable panoramic capture. It should be appreciated that lense 105 can include multiple lenses which can capture a field of view 155, 157, 158, 159.

FIG. 1B is a schematic diagram illustrating a set of embodiments 160, 170 for enabling the integration of a three hundred and sixty degree panoramic camera within a mobile phone case in accordance with an embodiment of the inventive arrangements disclosed herein.

In embodiment 160, two lenses 161, 162 can be positioned at the top edge and side edge of case 163. In one instance, lense 161 can capture field of view 165, 166 and lense 162 can capture field of view 167. In the instance, lenses 161, 162 can cumulatively capture field of view 165, 166, 167 which can result in an aggregate field of view of 270 degrees or greater.

In embodiment 170, a lense 171 can be positioned within the middle (e.g., vertically/horizontally) of back 172 of a case 173. In one instance, the lense 171 can be utilized to capture a panoramic media with a field of view 176. In the instance, lense 171 can capture a panoramic image or video with a field of view of 270 degrees or greater.

FIG. 1C is a schematic diagram illustrating a set of embodiments 180, 190, 192 for enabling the integration of a three hundred and sixty degree panoramic camera within a mobile phone case in accordance with an embodiment of the inventive arrangements disclosed herein.

In embodiment 180, a lense 181 can be positioned on the front 182 of a case 184. In one instance, lense 181 can be utilized to capture a panoramic media with a field of view 186. In the instance, field of view 186 can be greater than or equal to 270 degrees permitting a front facing panoramic media to be captured. For example, lense 181 can be utilized to capture a panoramic self-portrait (e.g., selfie) utilizing familiar means.

In embodiment 190, case 112 components 107, 108 can be coupled to phone 114 components 116, 117. In one instance, case 112 can harness power source 116 of phone 114 to enable components (e.g., 101-106, 108) to be powered and/or activated. In one embodiment, case 112 can be wirelessly communicatively linked to phone 114 via transceivers 108, 117. In another embodiment, case 112 can be physically communicatively coupled to phone via one or more data ports. For example, case 112 can include a pass-through connector which can permit case 112 to be physically coupled to a data connector (e.g., charging/data port) of phone 114 while permitting data connector to be unobstructed.

In embodiment 192, case 112 can include a camera 104 which can include a rear facing camera and a front facing camera. In one embodiment, phone 114 can trigger the usage of both front and rear facing cameras of the case 112 when a surround mode 130 is activated on phone 114. For example, mode 130 can permit camera 104 to capture a field of view 194, 196 when a panoramic image mode is selected within a camera application of phone 114. It should be appreciated that the camera 104 is not limited to this triggering and can be manually and/or automatically triggered in alternative ways.

Drawings presented herein are for illustrative purposes only and should not be construed to limit the invention in any regard. It should be appreciated that the case 112 can be appropriately configured to ensure phone 114 weight distribution is retained.

FIG. 2 is a schematic diagram illustrating a system 200 for enabling the integration of a three hundred and sixty degree panoramic camera within a mobile phone case in accordance with an embodiment of the inventive arrangements disclosed herein.

In system 200, end user device 210 can be communicatively linked and/or coupled to case 212. Case 212 can include, but is not limited to, panoramic camera 214, a flash, and the like.

The lenses 216 each represent an optical lens or assembly of lenses used to make images of object for storage on storage medium 224. Each lens 216 has a set of fundamental parameters associated, which include focal length and aperture. Each lens 216 may also be associated with image stabilizing components and pixel density. Lenses (216) can include, but is not limited to, wide-angle lenses, ultra-wide angle, apochromatic (APO) lens, a process lens, an enlarger lens, a fisheye lens, a stereoscopic lens, a soft focus lens, an infrared lens, an ultraviolent lens, a swivel lens, or a perspective control lens.

The flash of case 212 (not shown) is a component that produces a flash of artificial light (typically for $1/1000$ to $1/200$ of a second) at a color temperature of about 5500 K to help illuminate a scene. The flash may include a high capacity capacitor chargeable to several hundred volts. Flash can be an air-gap flash, a multi flash component (using multiple flashes to find depth edges or to create a stylized image), a high-current flash LED and the like. In one embodiment, the flash can be an omnidirectional one, which illuminates a front and a back side of the camera 214 (thus permitting front and rear lenses to capture an illuminated scene). The flash may be stationary relative to the device 210 and/or case, or may expend and retract within a body of the device case. In one embodiment, the flash of device 210 may be an assembly of two or more discrete components, such as a front facing flash and a rear facing flash which can be utilized by case 212 during operation.

The end user device 210 may be a stand-alone device, where all the surround mode imagery functionality is implemented internal to the end user device 210 and/or within case 212. In another embodiment, the end user device 210 may be a network 270 connected one, where one or more of the surround mode imagery functions are performed remotely, such as by an image processing server 280. End user device 210 may be a mobile communication device able facilitating user communications with one or more remote end-user devices 282. These communications can include the transmission and exchange of surround mode images. For example, end user device may use text messaging (with attachment), video conferencing (streaming video/images captured from imaging component 232), email image conveyances, image file synchronization sharing, and other technologies to provide end user device 282 with imagery from camera 214.

End user device 210 includes hardware 220 and software/firmware 250. Not all the elements shown in the hardware 220 and software/firmware 250 need be present for each implementation of the disclosure, and some implementations will include additional (not shown) components. The hardware 220 includes one or more processors 222, a storage medium, a transceiver 226, a display 228, a battery 230 (or other power source), imaging components 232, and the like. The processor 222 can be a central processing unit (CPU) or a microprocessor. Processor 222 carries out instructions of a computer program by performing arithmetical, logical, and input/output operations of a system. The processor 222 can be a single core or multi-core processor. Storage medium 222 can be a non-transitory storage medium, which refers to a medium that is not a carrier wave. Storage medium 222 stores or records information. Storage medium 222 can use magnetic storage, optical storage, electrical storage technologies, and the like.

Transceiver 226 is a component able to transmit and receive information to and from the end user device 210 and/or case 212. Transceiver 226 communicatively links device 210 to network 270, where the communication link may be a wired or wireless link.

Battery 230 is a power source that provides electronic energy to electronics of the end user device 210 and/or case 212. The battery 230 is often a chemical battery consisting of one or more electrochemical cells that convert stored chemical energy into electrical energy. Battery 230 may be rechargeable.

Imaging components 232 are components able to capture images and store those images onto storage medium 224. In one embodiment, the imaging components 232 are digital ones, which include image sensor 234, lenses 236, flash 238, sensors 240, and the like. The image sensors, typically charge-coupled device (CCD) or complementary metal-oxide-semiconductor (CMOS) sensor chips, turn light into discrete signals.

The sensors 240 include any of a variety of sensors used in photography. These sensors 240 can, for example, detect movement of the device 210, which is especially useful when taking time-spaced images (see step 134). Sensors 240 may include an accelerometer, a tilt sensor, a gyroscope, a global positioning system (GPS) element, a compass, a barometer, an altimeter, and the like.

The software/firmware 250 may include one or more of an image capture module 252, an image timing module 254, an image combiner 256, an optic control module 258, a digital imaging processor (DIP) module 260, a user interface module 262, and the like.

The image capture module 252 may capture images from multiple lenses facing substantially different directions. For example, the software/firmware of module 252 may capture images substantially concurrently from a front facing camera lens and a rear facing camera lens of a mobile phone.

The image timing module 254 module controls a timing of images from multiple different lens(es) 236. In one embodiment, the image timing module 254 can synchronize image capture times from a front facing lens and from a rear facing lens. Video from multiple different (and differently facing) lenses can also be timed. In one embodiment, the timing can be intentionally staggered and/or unified with a sensor (such as a tilt sensor or accelerometer) to take pictures after the device 210 have moved so that the lens(es) 236 cover a different field of view than what is covered in an initial image capture. Super-pixilation (from multiple different images at different times with slightly different angles) can be achieved in one embodiment, by suitable adjustments of the image timing module 254.

The image combiner 256 module combines content from multiple different lenses. The combiner 256 can stitch together images with common or overlapping regions. The image combiner 256 can create images including depth (3D and 4D images), in contemplated embodiments. The image combiner 256 may adjust lighting, contrast, and other image characteristics to optimize them, by combining images taken from different lens(se) 236.

The optic control module 258 controls optical components of the system. Focus, focal length, zoom, flash, angle, and the like are all able to be controlled by program instructions of the optic control module 258 being executed by processor 222.

The digital imaging processor (DIP) module 260 uses computer algorithms to perform image processing on digital images. The DIP module 260 can perform utilize technologies for pixilation, linear filtering, principal components analysis, independent component analysis, Hidden Markov models, anisotropic diffusion, partial differential equations, self-organizing maps, neural networks, wavelets, and the like. Additional DIP processing may occur in image processing server 280 in one embodiment.

User interface 262 can be a human-to-machine interface for the end user device 210. The user interface may interact through a touch screen display (228), to a set of one or more physical buttons that may exist within the hardware 220, to wirelessly connected peripherals that receive user input and/or produce output, and the like. The user interface 262 permits the user to take pictures, video, and sound recordings using the end user device 210. The user interface 262 also permits control of hardware/software functions related to imagery and to establish and change user configuration preferences.

Figure 3:
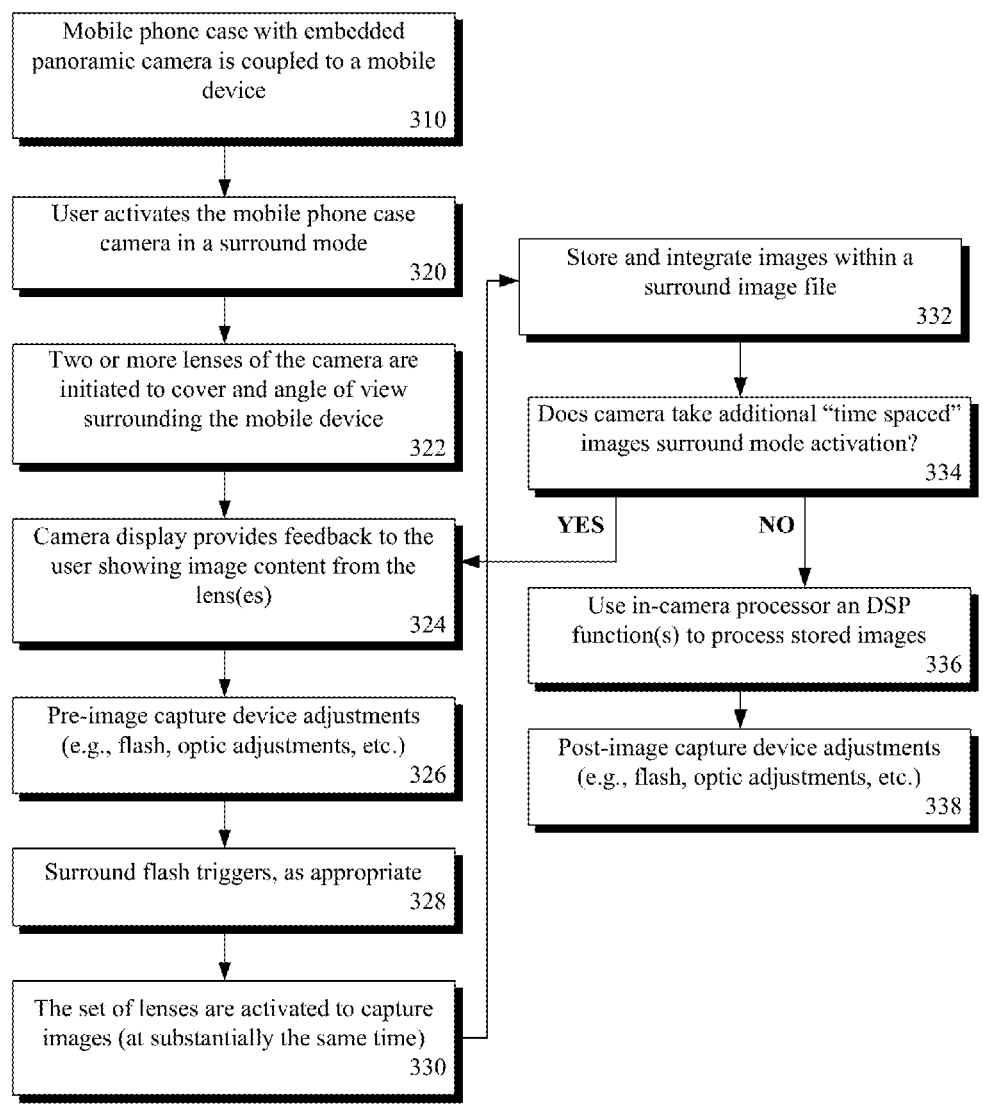
FIG. 3 is a schematic diagram illustrating a method for enabling the integration of a three hundred and sixty degree panoramic camera within a mobile device case in accordance with an embodiment of the inventive arrangements disclosed herein.

FIG. 3 is a schematic diagram illustrating a method 300 for enabling the integration of a three hundred and sixty degree panoramic camera within a mobile phone case in accordance with an embodiment of the inventive arrangements disclosed herein.

In step 310, a mobile phone case with an embedded panoramic camera can be coupled to a mobile phone. A user may activate a mobile phone case camera function in a surround image mode, as shown by step 320. In step 322, two or more lenses of the mobile phone case are initiated to cover an area on both side of the mobile phone. Initiating the lenses can take them from a minimal (or no power) state to an active one. In surround image mode, the total captured area of the multiple lenses is greater than one hundred and eighty degrees and may or may not be a continuous overlapping capture area.

In step 324, a display of the camera may provide feedback to a user showing image content from one or more lenses of the camera embedded within the case. The feedback can be displayed, for example, on a user interface (e.g., 310) shown on a touch screen (e.g., embodiment 190). In step 326, a set of pre-image capture device adjustments can occur. These adjustments may include focusing the lens, zooming the lens, repositioning and/or powering up a flash component (e.g., charging the capacitor), and the like. In step 328, a specialized flash (referred to as a surround flash) can be triggered as necessary/appropriate before image(s) are captured. The surround flash may illuminate an environment on both sides of a mobile phone.

In step 330, the lenses themselves are active to capture images. This image capture occurs (from the multiple lenses) at approximately or substantially the same time. In step 332, the images that were captured are stored in a storage medium and integrated within a single surround image file. Alternatively, a folder (referred to as a surround image folder) including multiple images from different lenses may be created. Additionally, both a surround image file and surround image folder may be used in embodiments (i.e., the surround image folder stores a set of lens-specific raw images and the surround image file is created from these raw images).

The camera of the mobile phone case may or may not take a series of time spaced images when surround mode is activated. This novel function is an extension of conventional panoramic functions, where a single lens is used to create a panoramic image by moving the camera of the case or the mobile phone itself (and the capturing lens) to create a capture region greater than otherwise possible. If a camera of the mobile phone does take additional time spaced images, the process 300 can progress from step 334 to step 324. Once all (if any) time spaced images are taken, the process may progress from step 334 to step 336. In step 336, an in-camera processor (or a remote one assuming the raw images are conveyed over a network to a remote server) may use one or more internal digital signal processing (DSP) function(s) to process stored images. In step 138, a set of post-image capture device adjustments may occur. These adjustments can change the power state of optic components, of a flash, may adjust the user interface 110, and the like.

FIG. 4A-H is a schematic diagram illustrating a set of embodiments for enabling the integration of a three hundred and sixty degree panoramic camera within a mobile phone case in accordance with an embodiment of the inventive arrangements disclosed herein.

Figure 4A:
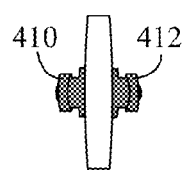
FIG. 4A-H is a schematic diagram illustrating a set of embodiments for enabling the integration of a three hundred and sixty degree panoramic camera within a mobile device case in accordance with an embodiment of the inventive arrangements disclosed herein.
Figure 4B:
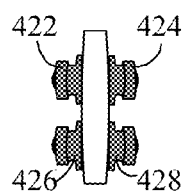
Figure 4C:
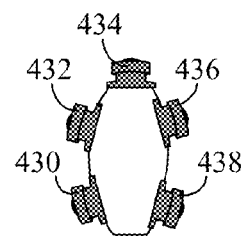
Figure 4D:
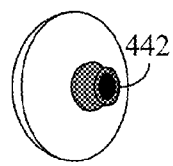
Figure 4E:
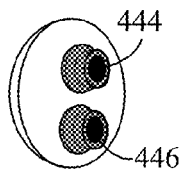
Figure 4F:
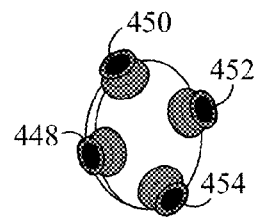
Figure 4G:
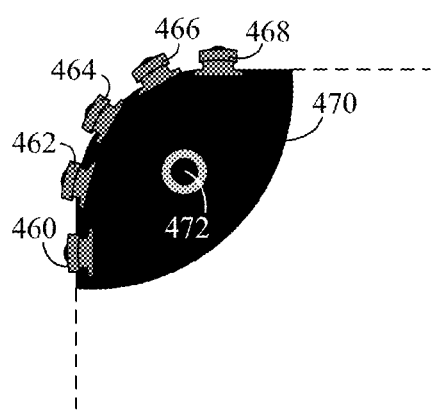
Figure 4H:
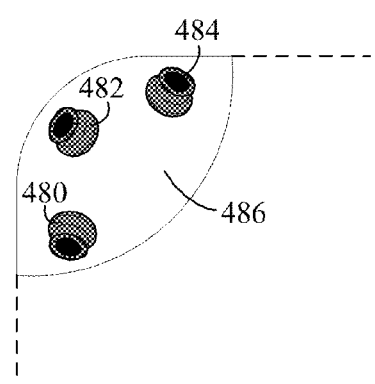

FIG. 4A-4H show different arrangements of lenses for a panoramic camera embedded within a case. Although the examples in FIG. 4A-4F assume a small optics board having lenses facing in different directions, one of ordinary skill can recognize that the shown lens arrangements can also apply for other positions. FIG. 4G shows a substantially opaque outer casing for a panoramic camera of a mobile phone case. FIG. 4H shows a substantially transparent outer casing for a panoramic camera of a mobile phone case.

FIG. 4A-4C show different side views of a dual facing panoramic camera of a mobile phone case. In FIG. 4A, one front facing lens 410 faces in an opposing direction to one rear facing lens 412. The lenses may have approximately equivalent or intentionally different imaging characteristics depending on implementation choices.

FIG. 4B shows two different lenses per side of a dual facing panoramic camera of a mobile phone case. These different lenses may be useful for different functions, and may have different optical characteristics. For example, one front facing 422 and one rear facing 424 lens may be normal lenses for standard pictures. The additional front facing 426 and rear facing 428 lenses may be ultra-wide lenses, which are able to capture a substantially greater field of view for a surround mode. The ultra-wide lenses may be subject to substantially more distortion than their counterparts 422, 424. Further, images can be captured using both the front facing 422, 426 and/or both the rear-facing 424, 428 lenses, which are able to be processed to achieve image results significantly better than is possible with a single lens alone. That is, the different optical characteristics of the lenses can be synergetic to produce a combined whole greater than either of the discrete parts. Use of two lenses facing in a common direction as shown by FIG. 4B can result in very flexible optics able to serve a gambit of functions.

FIG. 4C shows a series of five 430-438 different lenses, facing different angles about a curved surface of a panoramic camera base of a mobile phone case. The base may be a substrate into which the optical components are directly integrated. The base may also include additional components built on top a substantially flat substrate to produce fixed angles for the various lenses 430-438. As shown, a full overlapping field of view of greater than 270 degrees can be created from the five lenses 430-438. Software/firmware can be used to select which of the lenses 430-438 are to be used for which image capture functions of a mobile device.

FIG. 4D-4F show angled views of different lens arrangements. FIG. 4D represents a panoramic camera embedded within a mobile phone case, which has one lens 442 on the shown side. FIG. 4E represents a panoramic camera embedded within a mobile phone case having two lenses 444, 446 facing in the same direction. The single lens 442 may be on one side, and two lenses 444, 446 may be on an opposing side of the same panoramic camera. Alternatively, the panoramic camera can have the same number of lens per side (as shown by FIGS. 4A and 4B). Any number of lenses may appear on a single side of an image component, which are positioned in the same or different angles. For example, FIG. 4F shows four different lenses 448-454 on a single side of panoramic camera, which face at different angles relative to a substantially flat plane of that side of the panoramic camera. The sides of the camera may form substantially or approximately flat plains, or may be curved depending on implementation choices.

FIGS. 4G and 4H show an outer shell or segment 470 for a panoramic camera embedded within a mobile phone case consistent with corner segment 310. In FIG. 4G, a set of lenses 460-468 follow an outer curve of the segment 470. An additional front 472 and/or rear lens may be included in segment 470. The outer shell of FIG. 4G does not permit light to pass through in an optically significant fashion. Thus, either a portion of the lenses 460-468, 472) must physically extrude from the outer shell and/or the lenses 460-468, 472 can be inset into the shell 470 but a small transparent membrane can permit light to pass to the lenses 460-468, 472.

FIG. 4H shows a transparent outer shell for segment 486, which permits light to pass through to be captured by included lenses 480-484. The outer shell may be polarized/un-polarized and may have additional filters, which do not negatively affect an ability of the lenses 480-484 to capture light. A transparent outer shell permits light to pass through a variety of angles, which is highly beneficial for many surround image mode embodiments.

FIG. 5A-J is a schematic diagram illustrating a set of embodiments for enabling the integration of a three hundred and sixty degree panoramic camera within a mobile phone case in accordance with an embodiment of the inventive arrangements disclosed herein.

FIGS. 5G and 5H show embodiments where one or more lenses is stationary relative to a mounted surface (e.g., surface of a mobile phone case), which is connected by hinge 532. The surface can have a collapsed state 530, where the lenses are facing in approximately or substantially opposing directions. In a butterflied state 534, the surfaces can have a substantial angle between them, which results in lenses attached to the mounted surface capturing different content.

FIGS. 5I and 5J show another embodiment, where a surface mounts on a rotatable axle. The surface may have a first state 538, where an included set of lenses are in front and rear facing positions. The surface can rotate 544 about the axis, so that the included lenses are angled significantly.

Although many configurations for movable lenses are shown (FIG. 5D-5J) others are contemplated. For example, conventional pan, tilt, zoom (PTZ) mechanisms exist, which can be utilized herein. Additionally, instead of a track 522 along which a lens moves, a different track can be established to move the panoramic camera (e.g., 212).

Regardless of whether the lenses are fixed or movable, many different techniques exist for capturing images when operating in a surround mode. FIG. 5A-5C show an embodiment where two opposing lenses can capture 360 degree images in surround mode. As shown by FIG. 5A, a device positioned in an upward state 510 is able to capture front region 512 using a first facing lens and rear region 514 using a rear facing lens. While still in surround image mode, the device can be tilted sideways so it is in a sideward state 516. When so positioned, the front facing lens can capture region 518 and the rear facing lens can capture region 520. An accelerometer or other sensor (sensors 240) can detect this movement in one embodiment. Regions 512 and 514 can be captured at substantially a first point in time, and regions 518 and 520 can be captured at substantially a second point in time. The overall captured regions are shown in FIG. 5C, which assumes a stable pivot position of the imaging component. The regions 512-520 as shown in FIG. 5C substantially overlap, so that using images captured at two points in time, a surround region is captured.

Embodiments having actuator-associated lenses capable of movement can utilize a similar technique, where a first image is captured when a lens is in a first position (like state 524) and a second image is captured when a lens is in a second position (like state 526). Thus, different regions, which overlap in a surround mode (as shown in FIG. 5C, for example) can result from a mobile device maintained in a relatively stable position, in which image capture lenses move.

Unlike prior art, where a single lens is moved multiple times to join images into a panorama, using multiple lenses facing different directions (even when movement occurs) is less sensitive to motions in a captured scene. For example, a full three sixty degree region is captured using two time-spaced images (FIG. 5C) per the disclosure, where an equivalent using a single lens would require additional movements and image captures. Dynamic objects will likely be moving in a scene during these time periods, which greatly confounds problems with image stitching. Minimizing the movement (by using multiple lenses facing in different directions) either totally eliminates dynamic movement problems (in embodiments where images are captured at a single point in time) or significantly alleviates the problem (when multiple lenses facing different directions take images at two or more times) with dynamic artifacts.

Figure 6:
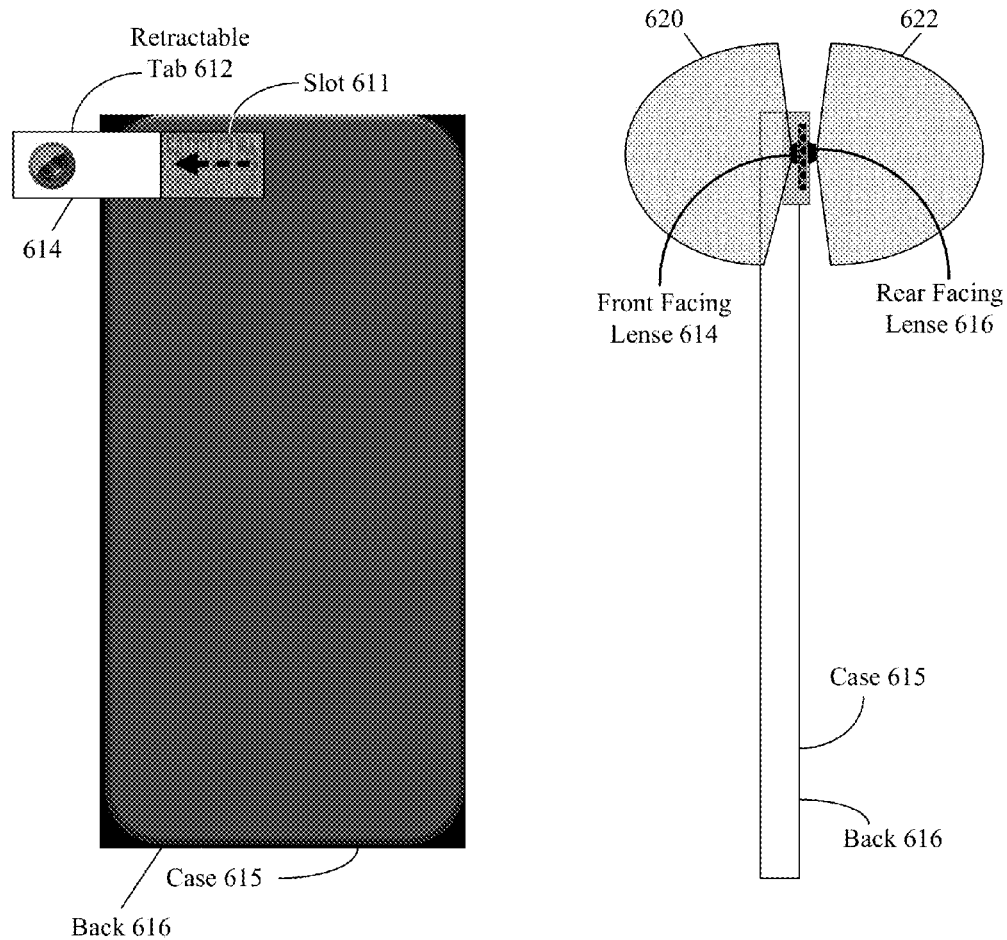
FIG. 6 is a schematic diagram illustrating a set of embodiments for enabling the integration of a three hundred and sixty degree panoramic camera within a mobile device case in accordance with an embodiment of the inventive arrangements disclosed herein.

FIG. 6 is a schematic diagram illustrating a set of embodiments 600 for enabling the integration of a three hundred and sixty degree panoramic camera within a mobile phone case in accordance with an embodiment of the inventive arrangements disclosed herein.

In embodiment 610, a front and rear facing lense 614, 616 can be embedded within a retractable tab 612. For example, tab 612 can slide out of slot 611 to permit a panoramic view (e.g., front 620 and back view 622) and/or panoramic media capture. In one instance, retractable tab 612 can be positioned within slot 611 of case 615. In one configuration of the instance, lenses 614, 616 can be operational regardless of tab 612 position. For example, when tab 612 is within slot 611 lense 616 can operate to capture a field of view 622. In another configuration of the instance, lenses can be non-operational when tab 612 is within slot 611. It should be appreciated that tab 612/slot 611 arrangement is an exemplary arrangement and is not limited to the configuration presented. For example, tab 612/slot 611 can permit vertical operation when mounted in a vertical arrangement (e.g., similar to a pop up flash). It should be appreciated that tab 612 can be manually and/or automatically actuated.

Drawings presented herein are for illustrative purposes only and should not be construed to limit the invention in any regard. In one instance, one or more panoramic lenses can be detachable coupled to a mobile phone case. For example, a lense can be electronically coupled utilizing magnetically attaching technologies (e.g., APPLE MAGSAFE). In another instance, one or more lenses can be embedded within a spring loaded flap which can hide and/or reveal one or more of the lenses.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing image capture from a mobile device comprising:

receiving a user activation of an image capture function of a mobile device, wherein the image capture function is for a surround image mode, wherein a case substantially encapsulating the mobile device comprises a first and second camera lenses that are positionable by an actuator to adjust an angle of view of captured images;

responsive to the user activation, approximately concurrently activating two or more camera lenses for capturing images at a first and a second time, said two or more camera lenses comprising a first and a second camera lens of the case, wherein said first and second camera lenses are interior components deposed between a front and a back side of the case, wherein a total size of a combined field of view of the first and second camera lenses is at least two hundred and seventy degrees;

at approximately the first time, capturing a front-side image using the first camera lens and a rear-side image using the second camera lens;

between the first time and the second time, the mobile device triggering the actuator to reposition at least one of the first and the second camera lenses to adjust the angle of view;

at approximately the second time, capturing a second front-side image using the first camera lens and a second rear-side image using the second camera lens, wherein at the second time, the actuator has adjusted the angle of at least one of the first and second camera lenses; and recording, in the single file for a surround mode image in a non-transitory storage medium of the mobile device, content from the second front-side image and the second rear-side image in addition to the front-side image from the first time and the rear-side image from the second time.

2. The method of claim 1, wherein the first and second camera lenses capture images in substantially opposing directions, wherein the first camera lens is a front facing lens, and wherein the second camera lens is a rear facing lens.

3. The method of claim 1, wherein single file has a panoramic image format.

4. The method of claim 1, wherein the first and the second camera lenses are ultra wide angle lenses, each having angles of view between one hundred and fifty degrees and one hundred and eighty degrees, wherein raw content captured by the first and second camera lenses are hemispherical images.

5. The method of claim 1, further comprising:
a processor within the mobile device stitching content from the first and second camera lenses together to create a substantially continuous image as the surround mode image.

6. The method of claim 1, wherein no overlapping region exists between the front side image and the rear side image.

7. The method of claim 1, wherein the one or more camera lenses comprise at third camera lens of the case, wherein the third camera lens is a side facing lens positioned approximately orthogonally to the first camera lens and the second camera lens, said method further comprising:
responsive to activating the lenses, optically capturing a side image from the third camera lens, wherein the single file for the surround mode image comprises content from the side image as well as content from the front-side image and the rear-side image.

8. The method of claim 1, wherein the front-side image and the rear-side image from the first time lack an overlapping region of a captured scene, wherein the second front-side image and the second rear-side image from the second time both overlap with the front-side image and with the rear-side image from the first time, wherein the content of the surround mode image is a continuous three-hundred and sixty degree image of the captured scene.

9. A mobile device case comprising:
two or more camera lenses, which comprise a first and a second camera lens of case, wherein the case substantially encapsulates the mobile device, wherein said first and second camera lenses are interior components deposed between a front and a back side of the case, wherein a total size of a combined field of view of the first and second camera lenses is at least two hundred and seventy degrees;
an actuator for positioning the first and second camera lenses to adjust an angle of view of captured images;
a non-transitory storage medium; and
one or more processors executing program instructions to:
receive a user activation of an image capture function of the mobile device, wherein the image capture function is for a surround image mode;
responsive to the user activation, approximately concurrently activating the two or more camera lenses for capturing images at a first and a second time
capture, at approximately the first time, a front-side image using the first camera lens and a rear-side image using the second camera lens;
trigger, between the first time and the second time, the actuator to reposition at least one of the first and the second camera lenses to adjust the angle of view;
capture, at approximately the second time, a second front-side image using the first camera lens and a second rear-side image using the second camera lens, wherein at the second time, the actuator has adjusted the angle of at least one of the first and second camera lenses; and
record, in the single file for a surround mode image in a non-transitory storage medium of the mobile device, content from the second front-side image and the second rear-side image in addition to the front-side image from the first time and the rear-side image from the second time.

10. The mobile device case of claim 9, wherein the two or more camera lenses are positioned in a corner of the case.

11. The mobile device case of claim 9, wherein the case comprises a removable section, wherein the removable section comprises imaging components comprising the two or more camera lenses, wherein different user pluggable removable sections enable different optical characteristics to be selectively enabled for the mobile device.

12. The mobile device case of claim 9, wherein the two or more camera lenses comprise a third camera lens, which is a side facing lens positioned approximately orthogonally to the first and the second camera lens.

13. The mobile device case of claim 9, wherein the case comprises a corner section that is optically transparent, wherein the corner section comprises imaging components for the case, wherein the image components comprise the two or more camera lenses, wherein the two or more camera lenses capture imagery through all sides of the optically transparent corner section.

14. The mobile device case of claim 9, wherein in addition to the first camera lens and the second camera lens, the two or more camera lenses comprise a rear-facing ultra-wide angle lens and a front-facing ultra wide angle lens.

15. The mobile device case of claim 9, wherein the case is a smart phone case accessory.

16. A computer program product comprising a non-transitory computer readable storage medium having computer usable program code embodied therewith, the computer usable program code comprising:
computer usable program code of a non-transitory storage medium configured to receive a user activation of an image capture function of a mobile device, wherein the image capture function is for a surround image mode, wherein a case substantially encapsulating the mobile device comprises a first and second camera lenses that are positionable by an actuator to adjust an angle of view of captured images from that camera;
computer usable program code of the non-transitory storage medium configured to responsive to the user activation, approximately concurrently activate two or more camera lenses for capturing images at a first and a second time, said two or more camera lenses comprising a first and a second camera lens of the case, wherein said first and second camera lenses are interior components deposed between a front and a back side of the mobile device wherein a total size of a combined field of view of the first and second camera lenses is at least two hundred and seventy degrees;
computer usable program code of the non-transitory storage medium configured to capture, at approximately the first time, a front-side image using the first camera lens and a rear-side image using the second camera lens;
computer usable program code of the non-transitory storage medium configured to trigger, between the first time and the second time, the actuator to reposition at least one of the first and the second camera lenses to adjust the angle of view;

computer usable program code of the non-transitory storage medium configured to capture, at approximately the second time, a second front-side image using the first camera lens and a second rear-side image using the second camera lens, wherein at the second time, the actuator has adjusted the angle of at least one of the first and second camera lenses; and computer usable program code of the non-transitory storage medium configured to record, in the single file for a surround mode image in a non-transitory storage medium of the mobile device, content from the second front-side image and the second rear-side image in addition to the front-side image from the first time and the rear-side image from the second time.

17. The computer program product of claim 16, wherein the first and second camera lenses capture images in substantially opposing directions, wherein the first camera lens is a front facing lens, and wherein the second camera lens is a rear facing lens.

18. The computer program product of claim 16, wherein the product is configured to communicate with electronic components of the case.

19. The computer program product of claim 18, wherein the components is the first and second camera lenses.

20. The computer program product of claim 18, wherein the components is at least one of a power source and a transceiver.

* * * * *